US010399313B2

United States Patent
Covelli et al.

(10) Patent No.: US 10,399,313 B2
(45) Date of Patent: Sep. 3, 2019

(54) BONDING OF HEAT-ACTIVATED FILMS INCLUDING A PLASTICIZER

(75) Inventors: Carmen A. Covelli, Chadds Ford, PA (US); Douglas K. Farmer, Greensboro, NC (US); Gavin N. Masters, Tsing Yi (CN)

(73) Assignee: INVISTA NORTH AMERICA S.A R.L., Wilmington, DE (US)

( * ) Notice: Subject to any disclaimer, the term of this patent is extended or adjusted under 35 U.S.C. 154(b) by 1127 days.

(21) Appl. No.: 12/269,360

(22) Filed: Nov. 12, 2008

(65) Prior Publication Data

US 2009/0124150 A1 May 14, 2009

Related U.S. Application Data

(60) Provisional application No. 60/987,500, filed on Nov. 13, 2007.

(51) Int. Cl.
*B32B 37/00* (2006.01)
*B32B 27/12* (2006.01)
(Continued)

(52) U.S. Cl.
CPC .......... *B32B 37/0038* (2013.01); *B32B 5/022* (2013.01); *B32B 5/024* (2013.01); *B32B 5/026* (2013.01); *B32B 9/025* (2013.01); *B32B 27/065* (2013.01); *B32B 27/12* (2013.01); *B32B 27/18* (2013.01); *B32B 27/22* (2013.01); *B32B 27/32* (2013.01); *B32B 27/34* (2013.01); *C09J 5/06* (2013.01); *C09J 7/21* (2018.01); *C09J 7/35* (2018.01); *C09J 175/02* (2013.01); *B29C 65/482* (2013.01); *B29C 65/4815* (2013.01); *B29C 65/50* (2013.01); *B29C 65/8207* (2013.01); *B29C 65/8223* (2013.01); *B29C 66/727* (2013.01); *B29C 66/9192* (2013.01); *B29C 66/91221* (2013.01); *B29C 66/91411* (2013.01); *B29C 66/91443* (2013.01); *B29C 66/91951* (2013.01); *B29K 2001/00* (2013.01); *B29K 2007/00* (2013.01); *B29K 2021/00* (2013.01); *B29K 2023/00* (2013.01); *B29K 2067/00* (2013.01); *B29K 2067/043* (2013.01); *B29K 2075/00* (2013.01); *B29K 2075/02* (2013.01); *B29K 2077/00* (2013.01);
(Continued)

(58) Field of Classification Search
CPC ..... B32B 27/12; B32B 37/00; Y10T 442/273; Y10T 442/2738
USPC .................................................. 442/149, 148
See application file for complete search history.

(56) References Cited

U.S. PATENT DOCUMENTS 5,521,273 A * 5/1996 Yilgor .................... C08G 18/10
528/65
7,240,371 B2 7/2007 Liu et al.
(Continued)

FOREIGN PATENT DOCUMENTS

JP 2000008007 1/2000
JP 2003226730 8/2003
WO WO 2006047431 A1 * 5/2006 ......... C08G 18/0866

*Primary Examiner* — Peter Y Choi
(74) *Attorney, Agent, or Firm* — Bridget C. Sciamanna; Kathleen Tyrrell

(57) ABSTRACT

Articles including a polymer film, a plasticizer and a substrate are included. A method of bonding the film to the substrate includes the use of the plasticizer which provides a durable bond by using a lower temperatures and shorter bonding times than would be required in the absence of the plasticizer.

3 Claims, 1 Drawing Sheet

(51) Int. Cl.

| | |
|---|---|
| *B32B 27/32* | (2006.01) |
| *B32B 27/34* | (2006.01) |
| *C09J 5/06* | (2006.01) |
| *C09J 175/02* | (2006.01) |
| *B32B 5/02* | (2006.01) |
| *B32B 9/02* | (2006.01) |
| *B32B 27/06* | (2006.01) |
| *B32B 27/18* | (2006.01) |
| *B32B 27/22* | (2006.01) |
| *C09J 7/35* | (2018.01) |
| *C09J 7/21* | (2018.01) |
| *B29C 65/50* | (2006.01) |
| *B29C 65/82* | (2006.01) |
| *B29C 65/00* | (2006.01) |
| *B29K 1/00* | (2006.01) |
| *B29K 7/00* | (2006.01) |
| *B29K 21/00* | (2006.01) |
| *B29K 23/00* | (2006.01) |
| *B29K 67/00* | (2006.01) |
| *B29K 75/00* | (2006.01) |
| *B29K 77/00* | (2006.01) |
| *B29K 105/04* | (2006.01) |
| *B29K 311/10* | (2006.01) |
| *B29L 31/48* | (2006.01) |
| *B32B 37/06* | (2006.01) |
| *B29C 65/48* | (2006.01) |

(52) U.S. Cl.
CPC ....... *B29K 2105/04* (2013.01); *B29K 2311/10* (2013.01); *B29K 2313/00* (2013.01); *B29L 2031/4871* (2013.01); *B29L 2031/4885* (2013.01); *B32B 37/06* (2013.01); *B32B 2250/40* (2013.01); *B32B 2262/0246* (2013.01); *B32B 2262/0261* (2013.01); *B32B 2262/0276* (2013.01); *B32B 2262/04* (2013.01); *B32B 2262/062* (2013.01); *B32B 2262/065* (2013.01); *B32B 2262/08* (2013.01); *B32B 2262/14* (2013.01); *B32B 2270/00* (2013.01); *B32B 2305/18* (2013.01); *B32B 2307/402* (2013.01); *B32B 2307/50* (2013.01); *B32B 2307/546* (2013.01); *B32B 2309/02* (2013.01); *B32B 2309/08* (2013.01); *B32B 2309/12* (2013.01); *B32B 2323/00* (2013.01); *B32B 2375/00* (2013.01); *B32B 2377/00* (2013.01); *B32B 2433/02* (2013.01); *B32B 2437/00* (2013.01); *B32B 2471/02* (2013.01); *B32B 2535/00* (2013.01); *B32B 2555/00* (2013.01); *B32B 2601/00* (2013.01); *C09J 2400/263* (2013.01); *C09J 2475/00* (2013.01); *Y10T 442/273* (2015.04)

(56) References Cited

U.S. PATENT DOCUMENTS

| | | |
|---|---|---|
| 2006/0183849 A1* | 8/2006 | Liu et al. ............ 524/589 |
| 2007/0082982 A1 | 4/2007 | Noda et al. |
| 2007/0135563 A1 | 6/2007 | Simmons et al. |
| 2008/0004395 A1 | 1/2008 | Covelli et al. |

* cited by examiner

BONDING OF HEAT-ACTIVATED FILMS INCLUDING A PLASTICIZER

CROSS-REFERENCE TO RELATED APPLICATIONS

This application claims the benefit of U.S. Provisional Application No. 60/987,500, filed on Nov. 13, 2007, which is incorporated herein in its entirety.

BACKGROUND OF THE INVENTION

Field of the Invention

The present invention relates to adhesive polymer films bonded to a fabric substrate with the addition of a plasticizer. Methods of bonding the films are also included.

Summary of Related Technology

Various polymers such as polyamides, polyolefins, and polyurethanes (including polyurethaneureas) can be used as adhesives for various substrates, including textile fabrics. Examples of films include thermoplastic polyurethane, polyamide, and polyolefin films commercially available from Bemis Associates, Shirley, Mass. Examples of polyurethaneurea films which are cast and dried from an aqueous polyurethaneurea dispersion are disclosed in U.S. Pat. No. 7,240,371 and U.S. patent application Ser. No. 11/780,819, filed on Jul. 20, 2007, both of which are incorporated herein by reference in their entirety.

The polymer films can be bonded to a fabric substrate by the use of heat and/or pressure. The temperature and duration of heat exposure depends on many factors such as the type of polymer and the thickness of the film. An adequate bond must be ensured, particularly where the fabric will be used in a garment that will endure repeated household and/or commercial laundering. The ability of a bond between a film and a fabric to endure repeated laundering or washing is referred to as "wash durability" which is an important and necessary property for a commercial garment fabric.

Depending on the polymer included in the film, differing amounts of heat and energy over must be used to ensure that the bond will have "wash durability." Methods and articles that achieve a durable bond with a reduced amount of energy and/or time will provide a commercial advantage due to savings in energy cost and production time. In addition, using a lower bonding temperature reduces the likelihood of damaging fine fabrics.

SUMMARY OF THE INVENTION

Some embodiments provide an article that includes a heat-activated adhesive film, a plasticizer, and a substrate. The film includes a polymer selected from the group consisting of polyurethanes, polyolefins, polyamides, and combinations thereof. The addition of the plasticizer to the film allows a reduced bonding temperature to be used while achieving a desired or pre-selected wash durability compared to a film that is bonded in the absence of a plasticizer.

In another embodiment of the invention is an article including a heat-activated adhesive film including a polyurethaneurea, a plasticizer including water and a substrate.

In a further embodiment is a method of bonding a substrate including:

(a) providing a heat-activated adhesive film to a substrate;
(b) applying a plasticizer to said film, to said substrate or both;
(c) adding heat to said film; and
(d) optionally applying pressure to said film, said substrate or both.

An additional embodiment provides a method for bonding fabric comprising:

(a) providing a heat-activated adhesive film to a fabric substrate;
(b) applying a plasticizer to said film, to said substrate or both; and
(c) adding heat to said film; and
(d) optionally applying pressure to said film, said substrate or both;

wherein the film includes a polyurethaneurea and the plasticizer includes water.

DETAILED DESCRIPTION OF THE INVENTION

Figure 1:
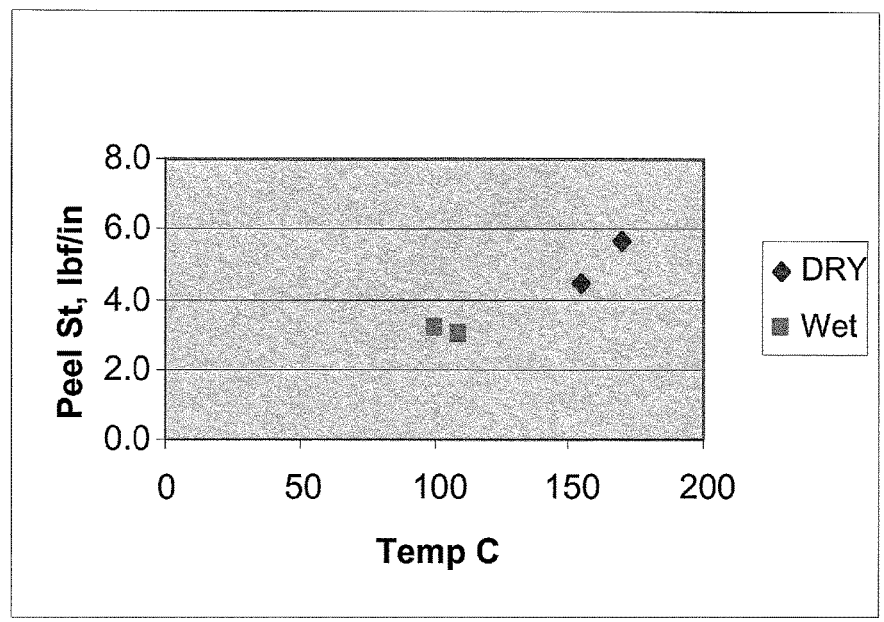
FIG. 1 is a chart demonstrating the peel strength comparing bonding with and without the use of a plasticizer.

As used herein, the term "porous" refers to a substrate that includes voids or holes in the surface or at any point within or through the thickness of the substrate or to any material of which the articles of the present invention may come into contact.

As used herein, the term "pressing" or "pressed" refers to an article that has been subjected to heat and/or pressure to provide a substantially planar structure.

As used herein, the term "foam" refers to any suitable foam that may be used in fabric construction such as polyurethane foam.

As used herein, the term "dispersion" refers to a system in which the disperse phase consists of finely divided particles, and the continuous phase can be a liquid, solid or gas.

As used herein, the term "aqueous polyurethane dispersion" refers to a composition containing at least a polyurethane or polyurethane urea polymer or prepolymer (such as the polyurethane prepolymer described herein), optionally including a solvent, that has been dispersed in an aqueous medium, such as water, including de-ionized water.

As used herein, the term "solvent," unless otherwise indicated, refers to a non-aqueous medium, wherein the non-aqueous medium includes organic solvents, including volatile organic solvents (such as acetone) and somewhat less volatile organic solvents (such as N-methylpyrrolidone (NMP)).

As used herein, the term "solvent-free" or "solvent-free system" refers to a composition or dispersion wherein the bulk of the composition or dispersed components has not been dissolved or dispersed in a solvent.

As used herein, the term "film" may describe a sheet material of any shape, but also includes films, tapes, dots, webs, stripes, beads, and other forms in a continuous or discontinuous form. The film may be self-supporting, meaning that they maintain their shape in the absence of a substrate, but may be supplied from a release paper or other useful substrate. A tape may describe a film in narrow strip form, including a narrow strip of from about 0.5 cm to about 3 cm. A film may be in the form of a tape.

As used herein, the term "fabric" is meant to include any knitted, woven or nonwoven material. Knitted fabrics may be flat knit, circular knit, warp knit, narrow elastic, or lace. Woven fabrics may be of any construction, for example sateen, twill, plain weave, oxford weave, basket weave, or narrow elastic. Nonwoven materials may be one of meltblown, spun bonded, wet-laid, carded fiber-based staple webs, and the like. The fabric may include many types of fibers such as nylon, cotton, polyester, wool, silk, cellosics, acetates, metals, acrylics, and combinations thereof.

As used herein, the term "substrate" refers to any material to which the films of some embodiments may be bonded. A substrate can be substantially one dimensional as in a fiber, two dimensional as in a planar sheet, or a three dimensional article or a bumpy sheet. A planar sheet for example may include fabric, paper, flocked article, and web. A three dimensional article for example may include leather and foam.

As used herein, the term "molded" article refers to a result by which the shape of an article or shaped article is changed in response to application of heat and/or pressure.

As used herein, the term "modulus" refers to a ratio of the stress on an item expressed in force per unit linear density or area.

The method of some embodiments provides for bonding a film including a polymer to a substrate, such as a fabric or foam. The method includes providing a heat-activated adhesive film to a substrate. The film will include one or more polymers described in greater detail below. A plasticizer is added to the film, the substrate or both. The bonding of the film to the substrate may be effected through the use of heat and optionally pressure. The heat and/or pressure may be applied to the film, the fabric, or both.

The plasticizer and heat may be applied sequentially or simultaneously. For example, the plasticizer may be added to the fabric followed by the application of dry heat or the plasticizer may be applied in a vapor form accompanied by heat, such as steam. The plasticizer will depend on the polymer in the film. Selection of the plasticizer is within the skill of those of ordinary skill in the art. For example, water is useful as a plasticizer with the polyurethane, polyurethaneurea and polyamide films. Plasticizers useful with polyolefins include mineral oil, paraffinic liquid plasticizers, and combinations thereof.

When pressure is added, it may be added sequentially or simultaneously with the plasticizer or heat. For example, applying the plasticizer may be followed by applying heat and pressure. Alternatively, pressure may be applied followed by application of the plasticizer, then heat, or the heat and plasticizer may be applied together, such as by steam. If desired, the pressure can be supplied in a mold so that the combination of the film and the substrate are bonded and obtain a shaped or molded article.

The heat and pressure may be supplied together or separately by a variety of different means. For example heat may be supplied by convection, conduction or radiation. Other means include microwave, infrared, conduction, ultrasonic. Combinations of any methods may also be used. When the heat and pressure are applied simultaneously, this may be in an autoclave or a heated press, or a steam press (where water is applied at the same time as the plasticizer). The article may also be clamped or placed into a mold prior to heating.

The appropriate temperature and time of application may vary depending on the polymer. When a polyurethaneurea film is used, suitable temperatures include about 150° C. or less, including from about 100° C. to about 150° C., about 100° C. to about 130° C., and about 100° C. to about 120° C.

The pressure applied to the articles of some embodiments may also vary depending on the polymer. The pressure may be from about atmospheric pressure to about 60 psi.

The adhesion can be activated, by applying heat and/or pressure onto a substrate and adhesive film, with a residence time from about 30 seconds to about 360 seconds, including from about 45 seconds to about 120 seconds. The residence time may also be less than about one minute, including from about 15 seconds to about 60 seconds. The bonded articles have good stretch/recovery properties and are durable in normal wear and wash cycles.

The films useful with the present invention may be prepared from a variety of different polymers and may be cast and dried from a polymer dispersion or solution, melted and molded, melt-extruded, or by any of number of conventional processes. The films may include nylon, polyolefin or polyurethane such as polyurethaneurea.

Aqueous polyurethane dispersions useful for preparing films included in some embodiments may be provided from particular urethane prepolymers. The prepolymers include the reaction product of a polyol and an isocyanate which is then chain extended to form a segmented polyurethaneurea composition. Specific examples are set forth in U.S. Pat. No. 7,240,371 and U.S. patent application Ser. No. 11/780,819, filed on Jul. 20, 2007.

In some embodiments, a segmented polyurethaneurea for making a polyurethaneurea dispersion includes: a) a polyol or a polyol copolymer or a polyol mixture of number average molecular weight between 500 to 5000 (such as from about 600 to 4000 and 600 to 3500), including but not limited to polyether glycols, polyester glycols, polycarbonate glycols, polybutadiene glycols or their hydrogenated derivatives, and hydroxy-terminated polydimethylsiloxanes; b) a polyisocyanate including diisocyanates such as aliphatic diisocyanates, aromatic diisocyanates and alicyclic diisocyanates; and c) a diol compound including: (i) hydroxy groups capable of reacting with polyisocyanate, and (ii) at least one carboxylic acid group capable of forming a salt upon neutralization, wherein the at least one carboxylic acid group is incapable of reacting with the polyisocyanate; d) chain extenders such as water, diol or an diamine chain extender including aliphatic diamine chain extenders or the combination of an aliphatic diamine chain extender with one or more diamines selected from aliphatic diamines and alicyclic diamines having 2 to 13 carbon atoms, or an amino-terminated polymer; and e) optionally a monoalcohol or monoamine, primary or secondary, as a blocking agent or chain terminator; and optionally an organic compound or a polymer with at least three primary or secondary amine groups.

The urethane prepolymers of some embodiments, also known as capped glycols, can generally be conceptualized as the reaction product of a polyol, a polyisocyanate, and a compound capable of salt-forming upon neutralization, before the prepolymer is dispersed in water and is chainextended. Such prepolymers can typically be made in one or more steps, with or without solvents which can be useful in reducing the viscosity of the prepolymer composition.

Depending on whether the prepolymer is dissolved in a less volatile solvent (such as NMP) which will remain in the dispersion; dissolved in a volatile solvent such as acetone or methylethyl ketone (MEK), which can be later removed; or is dispersed in water without any solvent; the dispersion process can be classified in practice as the solvent process, acetone process, or prepolymer mixing process, respectively. The prepolymer mixing process has environmental and economical advantages, and may be used in the preparation of aqueous dispersion with substantially no added solvent.

In the prepolymer mixing process, it is important that the viscosity of the prepolymer is adequately low enough, with or without dilution by a solvent, to be transported and dispersed in water. Polyurethaneurea dispersions derived from such a prepolymer, which meet this viscosity requirement and do not have any organic solvent in the prepolymer or in the dispersion may be used.

Depending on the desired effect of the polyurethaneurea film, the weight average molecular weight of the polymer in the film may vary from about 40,000 to about 250,000, including from about 40,000 to about 150,000; from about 70,000 to about 150,000; from about 100,000 to about 150,000; and about 120,000 to about 140,000.

Other useful polyurethanes include thermoplastic polyurethanes. These are commercially available from Bemis Associates of Shirley, Mass. as Product Nos. 3405 and 3410.

Polyamide films may also be used as the adhesive film of the present invention. Useful polyamides include nylon 6, nylon 6/6, nylon 6/10, and nylon 6/12. Commercially available nylon films include Product No. 4220 from Bemis Associates.

Polyolefin films may also be used in the articles of some embodiments. As used herein, the term "polyolefin" is meant to include polyolefins prepared from $C_2$ to $C_{20}$ monomers. This includes copolymers and terpolymers such as ethylene-propylene copolymers. Examples of useful polyolefin copolymers are disclosed in U.S. Pat. No. 6,867,260 to Datta et al., incorporated herein by reference.

A variety of different polyolefin compositions are useful with articles of some embodiments. For example, the articles of some embodiments may include a film which is prepared by melting and cooling onto a flat surface, melt extrusion or casting from a solution (the solution includes a solvent such as boiling xylene, boiling heptane, hot 1,2,4-trichlorobenzene, hot ethylene glycol monobutylether, or hot orthodichlorobenzene) an aqueous dispersion including a polyolefin powder and optionally a solvent, or a substantially solvent free aqueous dispersion. For example, a polyolefin solution such as a spinning solution or gel may be used to cast a film, according to some embodiments. Commercially available polyolefin films include Product Nos. 6218, 6343, 6344, 6371, and 6385 from Bemis Associates.

In some embodiments are multiple layer films may be used. These films include one or more distinct layers of a different polymer or a similar polymer with different weight average molecular weight. An example of a suitable multi-layer film is a three layer film of a polyurethaneurea with a center layer having weight average molecular weight of about 120,000 and adjacent layers having a weight average molecular weight of about 70,000. Combinations of one or more nylon layers with one or more polyolefin layers, one or more polyolefin layers with one or more polyurethaneurea layers and one or more polyurethaneurea layers with one or more nylon layers are also contemplated. Such combinations may include two or more layers of distinct polymer including a "sandwich" film with a layer of one polymer adjacent to two separate layers of another polymer.

The film substrate combination of some embodiments may also be a multiple layer article. One or more films or one or more substrate layers may be combined to form a multiple layer structure. This structure may be pressed flat or given a three-dimensional shape in a mold.

The film may form the internal or external layer of a fabric or garment. Alternatively, the film may be used in a "foldover" hem arrangement with a single fabric layer or may bond two separate fabric segments together. Including the film on an internal surface of a garment provides many advantageous functions. For example, the film may provide an anchor or area of increased friction to reduce the relative movement between the article including the film and an external substrate. This is particularly useful when the article is an undergarment including a skin-contacting surface (where the wearer's skin is the external substrate). Alternatively, the substrate may be outer clothing which is in contact with the film of the inventive article. Where the substrate is outer clothing of a wearer and the article is worn as an undergarment, the article prevents or reduces the relative movement of the outer garment. In addition, an outer garment (e.g. a dress) may include a polyurethaneurea composition to maintain the relative placement of an inner garment (e.g. a slip).

Due the application of heat and pressure to the articles including films and given that films prepared from dispersions and fabrics are themselves porous materials, it is recognized that the film may partially or completely impregnate the substrate, including fabric or foam substrates. For example, the film may form a layer which is partially separate from the adjacent substrate, or may be completely transferred to the surrounding layer or layers to form an integrated article without a distinguishably separate film layer.

One application of the multi-layer articles of the present invention is body-shaping garments such as brassieres (especially in cups or wings) and men's undergarments. These articles can provide the desirable features of comfort, body shaping and support while still providing comfort, breathability, air permeability, moisture/vapor transport, wicking, and combinations thereof. In the articles of some embodiments of the present invention, the layers may take on predetermined shapes and may be arranged in predetermined orientations relative to each other in the design of a molded or shaped article such as the cups of a brassiere construction. The layers of these fabrics may be used either alone or in combination with other materials that are sewn, glued or otherwise applied to the fabrics.

In some embodiments there is a system for the construction of a body-shaping garment with integrated shaping ability provided by the fabric. This system of construction may be used in a variety of different garment constructions such as activewear, sportswear, men's and women's intimate apparel such as bras, underwear, panties, shaping garments, legwear and hosiery such as pantyhose, ready-to-wear garments such as denim jeans, camisoles, tailored shirts, and pants among others. This construction may be applied to any formable body area. While many advantages of the fabric constructions are included, it is further recognized that the utility is not limited to garments, but also finds applicability with any shapeable or formable medium, including cushions for furniture which are also subject to movement and potential slipping of a fabric in contact with the shapeable area.

In order to add additional support and other features, the film may be added to different areas of the article. The film may either extend through the entire area of the article or to a selected portion to provide different benefits. For example, a brassiere may include a layered fabric of some embodiments in the cup portion. In the brassiere cup, it can be useful to use a portion of film in the lower portion of the cup for support, in a central portion of the cup for modesty, in the side portion for shaping, or in specific areas for embellishment or decoration.

A variety of different fibers and yarns may be used with the fabrics of some embodiments. These include cotton, wool, acrylic, polyamide (nylon), polyester, spandex, regenerated cellulose, rubber (natural or synthetic), bamboo, silk, soy or combinations thereof.

The components of the polyurethaneurea films of some embodiments are described in more detail below where the polyurethaneurea film is prepared from a polyurethaneurea dispersion:

Polyols

Polyol components suitable as a starting material for preparing urethane prepolymers, according to the invention, are polyether glycols, polycarbonate glycols, and polyester glycols of number average molecular weight of about 600 to about 3,500 or about 4,000.

Examples of polyether polyols that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, preferably a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (Invista) with a functionality of 2, is particularly preferred in the present invention.

Examples of polyester polyols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to about 50° C. is preferred.

Examples of polycarbonate polyols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is preferred.

Polyisocyanates

Examples of suitable polyisocyanate components include diisocyanates such as 1,6-diisocyanatohexane, 1,12-diisocyanatododecane, isophorone diisocyanate, trimethyl-hexamethylenediisocyanates, 1,5-diisocyanato-2-methylpentane, diisocyanato-cyclohexanes, methylene-bis(4-cyclohexyl isocyanate), tetramethyl-xylenediisocyanates, bis(isocyanatomethyl)cyclohexanes, toluenediisocyanates, methylene bis(4-phenyl isocyanate), phenylenediisocyanates, xylenediisocyanates, and a mixture of such diisocyanates. For example the diisocyanate may be an aromatic diisocyanate such phenylenediisocyanate, tolylenediisocyanate (TDI), xylylenediisocyanate, biphenylenediisocyanate, naphthylenediisocyanate, diphenylmethanediisocyanate (MDI), and combinations thereof.

The polyisocyanate component, suitable as another starting material for making urethane prepolymers according to the invention, can be an isomer mixture of diphenylmethane diisocyanate (MDI) containing 4,4'-methylene bis(phenyl isocyanate) and 2,4'-methylene bis(phenyl isocyanate) in the range of 4,4'-MDI to 2,4'-MDI isomer ratios of between about 65:35 to about 35:65, preferably in the range of about 55:45 to about 45:55 and more preferably at about 50:50. Examples of suitable polyisocyanate components include Mondur® ML (Bayer), Lupranate® MI (BASF), and Isonate® 50 O,P' (Dow Chemical).

Diols

Diol compounds, suitable as further starting materials for preparing urethane prepolymers according to the invention, include at least one diol compound with: (i) two hydroxy groups capable of reacting with the polyisocyanates; and (ii) at least one carboxylic acid group capable of forming salt upon neutralization and incapable of reacting with the polyisocyanates (b). Typical examples of diol compounds having a carboxylic acid group, include 2,2-dimethylopropionic acid (DMPA), 2,2-dimethylobutanoic acid, 2,2-dimethylovaleric acid, and DMPA initiated caprolactones such as CAPA® HC 1060 (Solvay). DMPA is preferred in the present invention.

Neutralizing Agents

Examples of suitable neutralizing agents to convert the acid groups to salt groups include: tertiary amines (such as triethylamine, N,N-diethylmethylamine, N-methylmorpholine, N,N-diisopropylethylamine, and triethanolamine) and alkali metal hydroxides (such as lithium, sodium and potassium hydroxides). Primary and/or secondary amines may be also used as the neutralizing agent for the acid groups. The degrees of neutralization are generally between about 60% to about 140%, for example, in the range of about 80% to about 120% of the acid groups.

Chain Extenders

The chain extenders useful with the present invention include diamine chain extenders and water. Many examples of useful chain extenders are known by those of ordinary skill in the art. Examples of suitable diamine chain extenders include: 1,2-ethylenediamine, 1,4-butanediamine, 1,6-hexamethylenediamine, 1,12-dodecanediamine, 1,2-propanediamine, 2-methyl-1,5-pentanediamine, 1,2-cyclohexanediamine, 1,4-cyclohexanediamine, 4,4'-methylene-bis(cyclohexylamine), isophorone diamine, 2,2-dimethyl-1,3-propanediamine, meta-tetramethylxylenediamine, and Jeffamine® (Texaco) of molecular weight less than 500.

Surface Active Agents

Examples of suitable surface active agents (surfactants) include: anionic, cationic, or nonionic dispersants or surfactants, such as sodium dodecyl sulfate, sodium dioctyl sulfosuccinate, sodium dodecylbenzenesulfonate, ethoxylated alkylphenols such as ethoxylated nonylphenols, and ethoxylated fatty alcohols, lauryl pyridinium bromide, polyether phosphates and phosphate esters, modified alcohol-ethoxylates, and combinations thereof.

Blocking Agents

The blocking agent for isocyanate groups may be either a monofunctional alcohol or a monofunctional amine. The blocking agent may be added at any time prior to formation of the prepolymer, during the formation of the prepolymer, or after the formation of the prepolymer including before and after dispersing the prepolymer into an aqueous medium such as deionized water. In some embodiments, the blocking agent is optional, or may be excluded. In other embodiments, based on the weight of the prepolymer, the blocking agent may be included in an amount from about 0.05% to about 10.0%, including about 0.1% to about 6.0% and about 1.0% to about 4.0%. Based on the weight of the final dispersion, the blocking agent may be present in an amount from about 0.01% to about 6.0%, including about 0.05% to about 3%, and about 0.1% to about 1.0%.

The inclusion of a blocking agent permits control over the weight average molecular weight of the polymer in the dispersion as well as providing control over the polymer molecular weight distribution. The effectiveness of the blocking agent to provide this control depends on the type of the blocking agent and when the blocking agent is added during the preparation of the dispersion. For example, a monofunctional alcohol may be added prior to the formation of the prepolymer, during or after the formation of the prepolymer. The monofunctional alcohol blocking agent may also be added to the aqueous medium into which the prepolymer is dispersed, or immediately following the dispersion of the prepolymer into the aqueous medium. However, when control over the polymer molecular weight and the molecular weight distribution in the final dispersion is desired, the monofunctional alcohol may be most effective if added and reacted as part of the prepolymer before it is dispersed. If the monofunctional alcohol is added to the aqueous medium during or after dispersing the prepolymer, its effectiveness in controlling the polymer molecular weight will be reduced due to the competing chain extension reaction.

Examples of monofunctional alcohols useful with the present invention include at least one member selected from the group consisting of aliphatic and cycloaliphatic primary and secondary alcohols with 1 to 18 carbons, phenol, substituted phenols, ethoxylated alkyl phenols and ethoxylated fatty alcohols with molecular weight less than about 750, including molecular weight less than 500, hydroxyamines, hydroxymethyl and hydroxyethyl substituted tertiary amines, hydroxymethyl and hydroxyethyl substituted heterocyclic compounds, and combinations thereof, including furfuryl alcohol, tetrahydrofurfuryl alcohol, N-(2-hydroxyethyl)succinimide, 4-(2-hydroxyethyl)morpholine, methanol, ethanol, butanol, neopentyl alcohol, hexanol, cyclohexanol, cyclohexanemethanol, benzyl alcohol, octanol, octadecanol, N,N-diethylhydroxylamine, 2-(diethylamino)ethanol, 2-dimethylaminoethanol, and 4-piperidineethanol, and combinations thereof.

When a monofunctional amine compound, such as a monofunctional dialkyl amine is used as a blocking agent for isocyanate groups, it may also be added at any time during preparation of the dispersion, desirably the monofunctional amine blocking agent is added to the water medium during or after the prepolymer dispersion. For example, the monofunctional amine blocking agent can be added to the water mixture immediately after the prepolymer is dispersed.

Examples of suitable mono-functional dialkylamine blocking agents include: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine. The molar ratio of the amine blocking agent to the isocyanate groups of the prepolymer prior to dispersion in water generally should range from about 0.05 to about 0.50, for example from about 0.20 to about 0.40. Catalysts may be used for the de-blocking reactions.

Optionally at least one polymeric component (MW> about 500), with at least three or more primary and/or secondary amino groups per mole of the polymer, may be added to the water medium after the prepolymer is dispersed and the blocking agent is added. Examples of the suitable polymeric component include polyethylenimine, poly(vinylamine), poly(allylamine), and poly(amidoamine) dendrimers, and combinations thereof.

Other Additives

Examples of suitable antifoaming or defoaming or foam controlling agents include: Additive 65 and Additive 62 (silicone based additives from Dow Corning), FoamStar® I 300 (a mineral oil based, silicone free defoamer from Cognis) and Surfynol™ DF 110L (a high molecular weight acetylenic glycol non-ionic surfactant from Air Products & Chemicals).

Examples of suitable rheological modifiers include: hydrophobically-modified ethoxylate urethanes (HEUR), hydrophobically-modified alkali swellable emulsions (HASE), and hydrophobically-modified hydroxy-ethyl cellulose (HMHEC).

Other additives that may be optionally included in the aqueous dispersion or in the prepolymer include: antioxidants, UV stabilizers, colorants, pigments, crosslinking agents, phase change materials (i.e., Outlast®, commercially available from Outlast Technologies, Boulder, Colo.), antimicrobials, minerals (i.e., copper), microencapsulated well-being additives (i.e., aloe vera, vitamin E gel, aloe vera, sea kelp, nicotine, caffeine, scents or aromas), nanoparticles (i.e., silica or carbon), calcium carbonate, flame retardants, antitack additives, chlorine degradation resistant additives, vitamins, medicines, fragrances, electrically conductive additives, and/or dye-assist agents. Other additives which may be added to the prepolymer or the aqueous dispersion comprise adhesion promoters, anti-static agents, anti-cratering agents, anti-crawling agents, optical brighteners, coalescing agents, electroconductive additives, luminescent additives, flow and leveling agents, freeze-thaw stabilizers, lubricants, organic and inorganic fillers, preservatives, texturizing agents, thermochromic additives, insect repellants, and wetting agents.

Optional additives may be added to the aqueous dispersion before, during, or after the prepolymer is dispersed.

The coating, dispersion, film or shaped article may be pigmented or colored and also may be used as a design element.

In addition, articles with laminated films or dispersions can be molded. For example, fabric can be molded under conditions appropriate for the hard yarn in the fabric. Also, molding may be possible at temperature which will mold the shaped article or dispersion, but below temperatures suitable for molding the hard yarn.

The thickness of the films may vary depending on the application. The final thickness may, for example, range from about 0.1 mil to about 250 mil, such as from about 0.5 mil to about 25 mil, including from about 1 to about 6 mil (one mil=one thousandth of an inch). Additional examples of suitable thicknesses include about 0.5 mil to about 12 mil, about 0.5 to about 10 mil, and about 1.5 mil to about 9 mil.

End articles that can be produced using the dispersions and shaped articles falling within the scope of the present invention include, but are not limited to: apparel, which includes any type of garment or article of clothing; knitted gloves; upholstery; hair accessories; bed sheets; carpet and carpet backing; conveyor belts; medical applications, such as stretch bandages; personal care items, including incontinence and feminine hygiene products; and footwear. Articles coated with dispersion or covered with film or tape may be used as sound suppression articles.

Examples of apparel or garments that can be produced using the dispersions and shaped articles falling within the scope of the present invention, include but are not limited to: undergarments, brassieres, panties, lingerie, swimwear, shapers, camisoles, hosiery, sleepwear, aprons, wetsuits, ties, scrubs, space suits, uniforms, hats, garters, sweatbands, belts, activewear, outerwear, rainwear, cold-weather jackets, pants, shirtings, dresses, blouses, men's and women's tops, sweaters, corsets, vests, knickers, socks, knee highs, dresses, blouses, aprons, tuxedos, bisht, abaya, hijab, jilbab, thoub, burka, cape, costumes, diving suit, kilt, kimono, jerseys, gowns, protective clothing, sari, sarong, skirts, spats, stola, suits, straitjacket, toga, tights, towel, uniform, veils, wetsuit, medical compression garments, bandages, suit interlinings, waistbands, and all components therein.

Methods for performing and overcoming common problems in reverse roll coating are described in Walter, et al., "Solving common coating flaws in Reverse Roll Coating," *AIMCAL Fall Technical Conference* (Oct. 26-29, 2003), the entire disclosure of which is incorporated herein by reference.

The features and advantages of the present invention are more fully shown by the following examples which are provided for purposes of illustration, and are not to be construed as limiting the invention in any way.

Test Method

Peel Strength, an indicator of bond strength, as discussed in the examples was determined according to ASTM D903-93, the entire disclosure of which is incorporated herein by reference as modified for testing of film laminated fabrics. The sample size used for testing was 1 inches×6 inches (2.5 cm×15 cm). The separation rate was 2 inches per minute (5 centimeter per minute). Data are reported as pounds of force per inch of sample width.

EXAMPLES

Examples 1-3 demonstrate the method of including water as a plasticizer in combination with a polyurethaneurea (PUU) film. The polyurethaneurea compositions are disclosed in U.S. Pat. No. 7,240,371 and U.S. patent application Ser. No. 11/780,819, filed on Jul. 20, 2007. The molecular weight (Mw) described in the examples is a weight average molecular weight.

Example 1

Polyurethaneurea (PUU) tapes were bonded to fabric using a SewSystems™ heat tape bonding machine. The test results using a PUU tape having 40,000 and 70,000 Mw are summarized in the Table 1 below. The SewSystems™ heat tape bonding machine set plate temperature was as noted in Table 1 and 350° C. for hot air. The fabric was a warp knit fabric from Ruey Tay, 930413 222, made with Tactel® Nylon and Lycra® spandex was fed into the machine at a speed of 0.5 m/min. The actual temperature in the bond zone was measured. In Table 1, the sample condition is "dry" if the film was used as received. The sample condition is "wet" where water was put on the sample as a plasticizer before bonding.

TABLE 1

| Set Point (° C.) | Condition | Actual Temp (° C.) | Film Mw | Peel Strength (lbf/in) |
|---|---|---|---|---|
| 200 | Dry | 155 | 70,000 | 4.5 |
| 200 | Wet | 100 | 70,000 | 3.2 |
| 220 | Dry | 170 | 70,000 | 5.7 |
| 220 | Wet | 110 | 70,000 | 3.0 |
| 200 | Dry | 155 | 40,000 | 6.8 |
| 200 | Wet | 100 | 40,000 | 6.1 |
| 220 | Dry | 170 | 40,000 | 6.6 |
| 220 | Wet | 110 | 40,000 | 5.9 |
| 121 | Dry | 100 | 40,000 | 3.3 |

The data shows that for the 40,000 Mw film, wet heat at 100° C. gave bond strength equal to that achieved by dry heat at 170° C. Lower bonding temperature helps retains the aesthetics, handle and power of the substrate fabric. For the film having a Mw of 70,000 wet heat at 100° C. gave a bond strength>50% that achieved with dry heat at 170° C. The differences in bonding temperatures and strength for the 70,000 Mw film is shown in FIG. 1.

Example 2

A "sandwich" tape of polyurethaneurea was prepared including adjacent layers of PUU as follows: 3 mil 70,000 Mw, 3 mil 120,000 Mw and 3 mil 70,000 Mw. Similarly to Example 1, these tapes were bonded to fabric using a SewSystems™ heat tape bonding machine. The test results Table 2 below. A SewSystems™ heat tape bonding machine set plate temperature as noted in table and 350 C for hot air, a warp knit fabric from Ruey Tay, 930413 222, made with Tactel® Nylon and Lycra® spandex was fed into the machine at a speed of 0.5 m/min. The actual temperature in the bond zone was measured. In Table 2, the sample condition is "dry" if the film was used as received. The sample condition is "wet", where water was put on the sample before bonding.

TABLE 2

| Bond Temp Actual (° C.) | Set Point (° C.) | Peel (lbf/in) |
|---|---|---|
| Dry 102 | 118 | 0.38 |
| Wet 102 | 240 | 1.95 |

The results in Table 2 demonstrate that greater bond strength was achieved with the inventive process of including a plasticizer compared to a dry film at the same temperature.

Example 3

A film including polyurethaneurea of about 70,000 Mw was placed between two layers of a nylon/spandex fabric and pressed with nominal heat. Then the fabric samples were placed in a pressurized steam autoclave for bonding at various time/temperature combinations. The autoclave was a FIRSAN Brava sock boarding machine. The samples were suspended vertically and passed through the boarding process at the various conditions.

Figure 2:
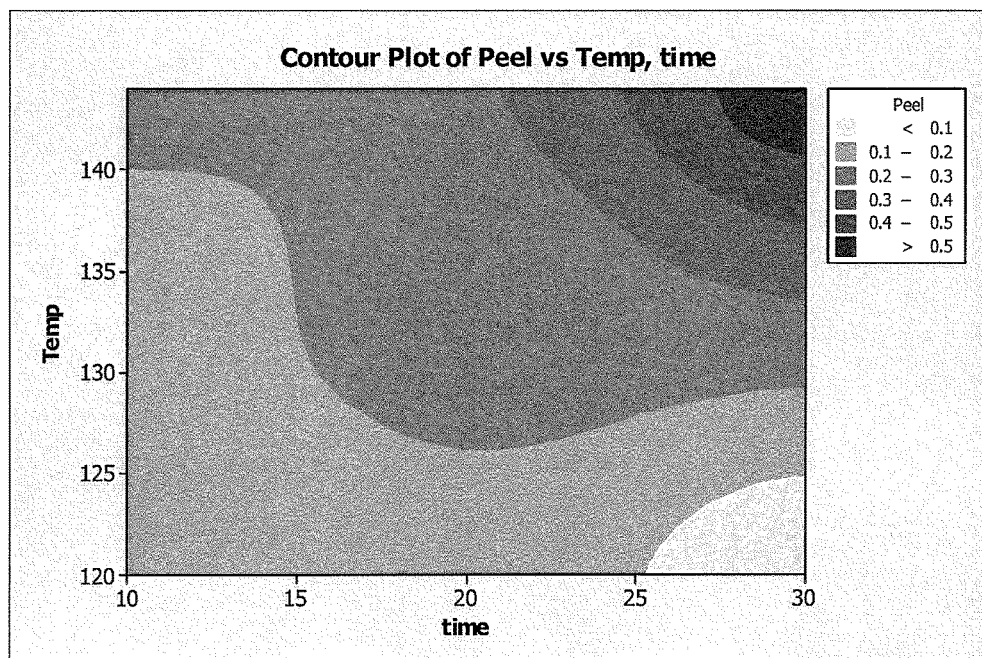
FIG. 2 is a chart demonstrating the effects of temperature and time on peel strength.

The range of temperatures was 120-144° C. for a time range of 10-30 seconds. The contour plot of FIG. 2 shows that increasing temperature or time or both leads to progressively stronger bonding. FIG. 2 also demonstrates that a suitable bonding strength may be achieved by the use of pressure steam.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. An article comprising:
   a heat-activated adhesive multilayer film comprising at least an inner layer, a center layer and an outer layer, wherein
   the center layer comprises a polymer comprising polyurethaneurea with a weight average molecular weight of from about 40,000 to about 250,000,
   the outer layer comprises polymer comprising a polyurethaneurea with a molecular weight of about 70,000 and
   the inner layer comprises polymer comprising a polyurethaneurea with a molecular weight of about 120,000; and
   a substrate to which the heat-activated adhesive multilayer film is bonded by application of heat and pressure in the presence of a plasticizer comprising water placed on the heat-activated adhesive multilayer film prior to or during bonding to a substrate.

2. The article of claim 1, wherein said substrate comprises a fabric.

3. The article of claim 2, wherein said fabric substrate is selected from the group consisting of nylon, cotton, polyester, wool, silk, and combinations thereof.

\* \* \* \* \*